United States Patent [19]

Graham

[11] Patent Number: 5,290,206
[45] Date of Patent: Mar. 1, 1994

[54] BAR-BAND VARIABLE CIRCUMFERENCE ADJUSTABLE-DRIVE PULLEY MECHANISM

[76] Inventor: James A. Graham, 3712 N. Broadway, Chicago, Ill. 60613

[21] Appl. No.: 837,920

[22] Filed: Feb. 20, 1992

Related U.S. Application Data

[63] Continuation-in-part of Ser. No. 760,188, Sep. 16, 1991, Pat. No. 5,116,282, which is a continuation-in-part of Ser. No. 597,318, Mar. 22, 1990, Pat. No. 5,049,113.

[51] Int. Cl.$^5$ ............................................... F16H 55/00
[52] U.S. Cl. .................................... 474/49; 474/101
[58] Field of Search ................. 474/12, 13, 16, 17, 474/49, 101, 111; 180/230, 338

[56] References Cited

U.S. PATENT DOCUMENTS 3,747,721 7/1973 Hoff .............................. 474/13 X
4,179,946 12/1979 Kanstoroom ....................... 474/16
4,992,066 2/1991 Watson ........................... 474/111 X
5,049,113 9/1991 Graham, Jr. ....................... 474/49

*Primary Examiner*—Thuy M. Bui
*Attorney, Agent, or Firm*—Jerome J. Norris

[57] ABSTRACT

A variable inverted pulley circumference mechanism supported by an external mechanism that locates the pulley halves. Power transfer takes place via either a combination of a variable pulley located inside the variable inverted pulley, working together with fixed planet wheels, or with innovative variable span planet mechanisms working together with a traditional sun wheel or a variable pulley in place of a traditional sun, wherein the variable circumference mechanism consist of one or more surfaces, so that part of the surface is used as needed to form the circumference, and unused parts of the surface is stored opposite of a contact surface of the circumference.

5 Claims, 2 Drawing Sheets

BAR-BAND VARIABLE CIRCUMFERENCE ADJUSTABLE-DRIVE PULLEY MECHANISM

The application is a continuation-in-part of U.S. patent application Ser. No. 07/760,188, filed on Sep. 16, 1991, now U.S. Pat. No. 5,116,282, which is a continuation-in-part of U.S. patent application Ser. No. 07/597,318 filed on Mar. 22, 1990, now U.S. Pat. No. 5,049,113.

BACKGROUND OF THE INVENTION

1. Field of the Invention

The invention pertains to an adjustable.speed drive mechanism for imparting and receiving rotational force, wherein said mechanism comprises a variable diameter pulley assembly and a flexible belt or chain wrapped around the axle of the pulley, that serves as a gripping application.

2. The Prior Art

Variable diameter pulley systems have long been used in the mechanical transmission art, and are well known as inexpensive, but highly efficient means to derive infinitely variable output speeds from a constant power source, or means to cause an increase or a decrease in torque from a variable power source.

For example, in U.S. Pat. No. 4,179,946 there is disclosed a variable diameter, centrifugally responsive, tension operated pulley, which when used in combination with a substantially similar pulley and belt, provides a controlled.speed variable ratio acces. sory drive.

An automatic transmission for small motorized vehicles is disclosed in U.S. Pat. No. 3,747,721 and incorporates variable diameter pulleys, whereby drive ratios can easily be changed between upper and lower limits.

The June 1989 issue of *Machine Desion* magazine presents an overview of variable speed transmissions in an article entitled "Mechanical Adjustable-Speed Drives." This magazine indicates that the efficiency of a variable diameter pulley system is usually about 95%, and that such systems provide good overload and jam protection due to favorable slips (i.e., the belts provide good overload and jam protection because the belt slips when overloaded).

However, despite the aforementioned advantages, variable diameter pulleys are known to be critically limited in relation to other types of mechanical transmissions insofar as the amount of useful power which can be handled due to the natural torque limitations of the belt and pulley combination itself.

Accordingly, a need exist in the mechanical transmission art, for a reliable method of increasing the torque handling capability of a variable diameter pulley.

With all current belt and pulley systems, contact between the belt and the pulley occurs on the side of the belt. Because of the small thickness of the belt necessary for belt flexibility, the contact area is small. In addition, the power transfer occurs by friction because the variable diameter prevents installing gear teeth or other positive engaging mechanisms on the side of the pulley. In this connection, it should be noted that some variable pulleys have ribs on the contact surfaces; however, the ribs and/or their spacing increases with increasing distance from the axis of the pulley half. Such systems can provide for a non-slip engagement,but only for very limited power, since the changing spacing on the pulley halves is incompatible with the fixed spacing on the belt.

SUMMARY OF THE INVENTION

One object of the present invention is to provide an inverted variable pulley mechanism for power transmission internal to variable pulley mechanism.

A further object of the present invention is to provide a variable diameter inverted pulley assembly that incorporates an external storage area capable of receiving and storing a flexible surface therein.

A yet further object of the present invention is to provide a variable planetary mechanism consisting of a variable mechanism for a variable sun gear and/or a variable inverted circumference mechanism for a variable ring gear and/or variable span gear assembled for the planet gear.

A still further object of the invention is to provide a bar.band variable circumference mechanism (VCM) that forms a variable circumference without use of a variable pulley.

In general, the invention is attained by providing a variable diameter pulley that is supported by a hollow spindle that is used in conjunction with a flexible surface in a manner such that the surface effectively increases the tractional forces of the pulley. The pulley can serve as either a driving member or as a driven member. The surface encircles the axle of the pulley and is held tightly thereto by a novel storage compartment in the hub of the pulley, thereby eliminating any slackness in the surface as the pulley halves move outwardly from one another.

In this assemblage, one end of the surface is permanently attached to an outer edge of the axle, while the other end of the surface is fastened to a tensioning means inside the axle. One possible tensioning means comprises cables connected to each of the pulley halves cooperatively. As the pulley halves move toward one another axially, the surface is automatically urged out of the storage compartment located in the hub, to allow the surface to smoothly ride-up the sides of each pulley half to achieve an outer diameter that is gauged to suit the increased working diameter of the pulley. Conversely,as the pulley halves move outwardly, the surface is recalled and stored in the hub, thereby assuming an effective circumference commensurate with the now decreased working diameter of the pulley.

With this arrangement, contact between the pulley and the transfer mechanism (belt, chain, gear, or equivalent) occurs primarily at the engaging surface, and can occur secondarily on the sides of the pulley above the engaging surface if a belt is used. The engaging surface inherently provides a larger contact area than the belt sides for a normal variable pulley, and can be widened as necessary to transmit any amount of power. The engaging surface can have "V" grooves running along its length for use with multi-ribbed belts or multiple belts for additional power. Conversely, the engaging surface can be equipped with gear teeth for positive engagement instead of friction engagement. Gears or toothed belts can be used for high power non-slip power transfer.

In the bar-band variable circumference mechanism (VCM), the surface is the same as for the variable pulley and the possibilities for the surface are the same. Further, storage of the surface(s) is similar to the variable pulley; however, in the barband VCM, the circumference is determined by moving the guide member(s) and supports in concert along radial arms, thereby fixing points to form the circumference.

Further still, in the bar-band variable circumference mechanism (VCM) there are no pulley halves to support the circumference, and the guide members are necessary as attachment points for the surfaces, and for a transition from the circumference to the storage areas. Also, the circumferential support from a variable pulley is missing; however, this is provided by using bands of limited flexibility to tension the internal storage version, or compress the external storage version. Tensioning mechanisms are added to the guide members to perform this function, and storage similar to the surface storage version is provided.

DETAILED DESCRIPTION OF THE INVENTION

Figure 1:
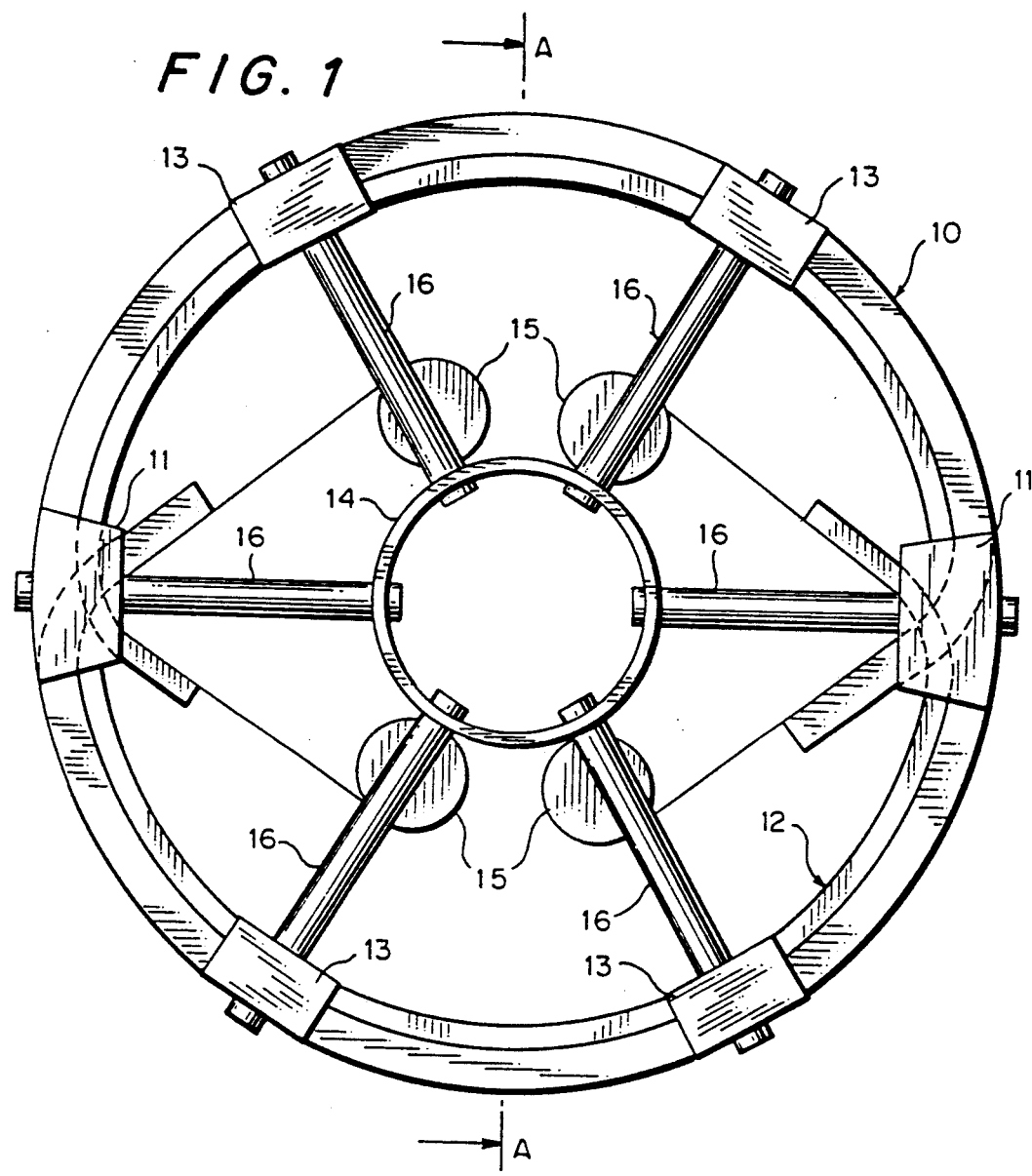
FIG. 1 depicts an end view of an internal bar-band variable circumference mechanism.

The invention may be attained by providing a variable inverted pulley that is supported by an external mechanism that located the pulley halves. Power transfer takes place via either a combination of variable pulley located inside the variable pulley, working together with fixed planet wheels, or with innovative variable span planet mechanisms working together with a traditional sun wheel or a variable pulley in place of the traditional sun.

In this assemblage, power transfer takes place by friction contact of the planets to the sun and ring mechanisms. The action of the various variable mechanisms is coordinated to preserve contact over the various diameter changes.

Further, the invention may be attained by providing a variable inverted circumference mechanism consisting of a variable inverted pulley that is supported by an external mechanism that located the inverted pulley halves, and provides storage for flexible surface. The surface is encircled by the inverted pulley halves and is held tightly thereto by a novel band expansion mechanism, thereby eliminating any slackness in the surface, as well as eliminating kinking of the surface into the hollow center. Power transfer takes place via either a combination of a variable circumference mechanism located inside the variable inverted circumference mechanism, working together with fixed planet mechanism, or with innovative variable.span planet mechanisms working together with a traditional sun mechanism or a variable circumference mechanism in place of the traditional sun. Any number of surfaces can be used on the various mechanisms, including, but not limited to, clogs, gear teeth, or multiple.V surfaces. Friction or mechanical interlocking power transfer results depending on the surface used.

In this assemblage, one end of the surface is permanently attached to the inverted pulley halves at slots in the pulley halves, or to a guide member riding in the slots. The other end of the surface is attached to a tensioning mechanism located in the external storage area. As the pulley halves move toward each other, the slack is taken up by the tensioning mechanism, perhaps together with a tensioning/locking mechanism located on the guide assembly. Since the pulley halves are inverted, they tend to compress the surface rather than expand to apply circumferential pressure to keep the surface in contact with the inverted pulley halves. They operate cooperatively with the inverted pulley halves to trap the surface between the bands and the inverted pulley halves, with the inverted pulley halves on the outside. The excess bands are stored in separate parts of the external storage area, and the compression mechanism are located on the sides of the guide assembly. When the inverted pulley halves move outwardly, the bands are simultaneously pushed out by the compression mechanism, causing the surface to maintain contact with the inverted pulley halves, and thereby urging stored sections of the surface out of the storage area and onto the inverted pulley halves.

The variable inverted circumference mechanism has its power transfer on the inside, like the aforementioned variable inverted pulley. As a result, one of the planetary arrangements used for the variable inverted pulley is necessary. Power transfer is by friction or mechanical interlock according to the surface used.

Further sill, the invention may be attained by providing a flexible surface with a guide member and locking mechanism to determine the circumference, band and compression mechanisms to push out on the surface and form the circumference, and locating mechanisms to support the bands.

The locating mechanisms could be short channel sections that snugly fit a band, attached to a linear screw mechanism cooperatively operated with the band compression mechanisms. The excess surface and excess band sections would be stored inside, similar to the variable circumference mechanism using variable pulleys.

Finally, the invention may be attained by providing an inverted variable circumference mechanism consisting of a flexible surface with guide member and locking mechanism to determine the circumference, band and compression mechanisms to push in on the surface and form the circumference, and locating mechanisms to support the band. The locating mechanisms could be short channel sections that snugly fit a band, attached to a linear screw mechanism cooperatively operated with the band compression mechanisms. The excess surface and excess band sections would be stored outside, similar to the variable circumference mechanism using inverted pulleys.

As can be seen from FIG. 1, the end view of the internal bar-band variable circumference mechanism comprises surfaces 10, guide members 11, band 12 disposed inside of said surfaces, and supports. At the center of the internal bar-band VCM is a hub 14 about which storage areas 15 are symmetrically disposed inside of radially extending arms 16.

Figure 1A:
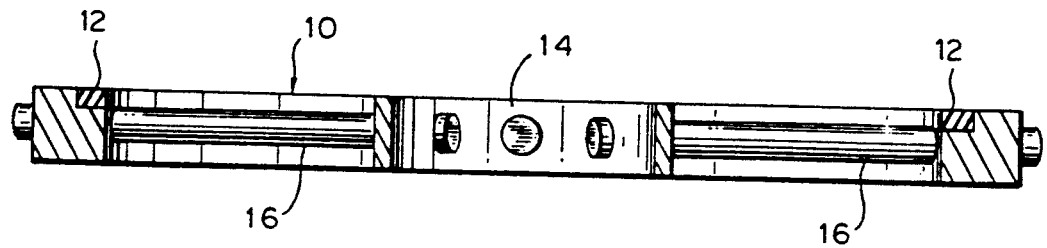
FIG. 1A is a cross-sectional view along line A—A showing the interaction between the bands and the surface.

Interaction between bands 12 and surface 110 is shown in the cross-sectional view of the surface and the bands along line A—A of FIG. 1, as can best be seen in FIG. 1A.

Figure 2:
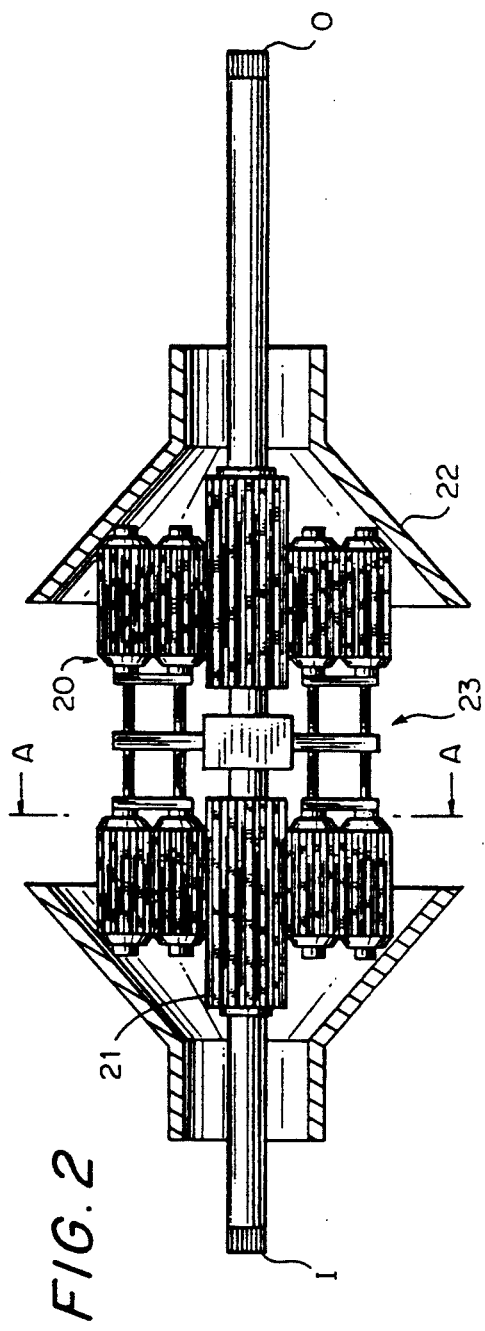
FIG. 2 depicts a side view of the inverted variable pulley.

In the side view of the inverted variable pulley shown in FIG. 2, there is shown gear/roller 20 disposed about a gear hub 21; said combination of the gear/roller-gear hub being partially disposed within inverted pulley halves 22 in connecting relationship with an adjustor mechanism 23 disposed midway between the two inverted pulley halves, in which there is an input side I and an output side 0.

Figure 2A:
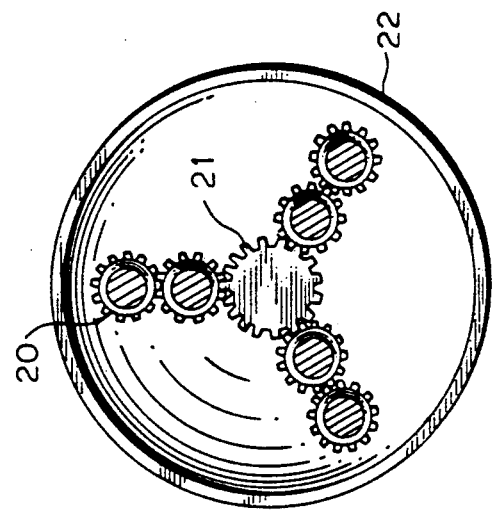
FIG. 2A depicts an end view along line A—A of FIG. 2.

FIG. 2A shows end view of the inverted variable pulley of FIG. 2 taken along line A—A.

In the adaptation of variable pulley halves and surface segments of the invention to increase power handling in those cases where the surface may be stretched by the power transfer through it, the surface and pulley halves may be intermeshed to provide multiple power transfer points. Since the surface is attached to the pulley halves, and any segment will trace the same path along the pulley halves as the circumference into the pulley halves extensions from the the surface segments can then ride in the spiral grooves and power transfer would then take place at the grooves. The extension may be wheels, or they may have bearing surfaces to reduce friction that would be associated with moving them in grooves.

While the present invention has been set forth with respect to the particular embodiments herein, it can be readily seen by those having ordinary skill in the art that numerous modi fications are possible. Therefore, such modifications would easily fall within the scope of the invention claimed.

I claim:

1. A surface system for a variable circumference mechanism, comprising:

a splined, rotatably supported, hollow, axle member having at least one longitudinally extending opening;

a variable diameter traction element carried by said axle member, wherein said traction element includes a pair of outwardly biased frusto-conical pulley members capable of relative axial movement along said axle member;

at least one flexible engaging element for positively contacting power transfer means riding upon said traction assembly; and tensioning means operatively connected to said engaging element, whereby stress exerted upon said tensioning means causes said engaging element to retract into said axle member through said longitudinal opening, so that said flexible engaging element is tightly carried by said traction element through every degree of variation, said frusto-conical pulley halves having at least one slot to allow storage of unused portions of said engaging element;

and wherein said variable circumference mechanism consist of one or more surfaces, wherein part of the surfaces are used as needed to for the circumference, and unused parts of the surface are stored opposite a contact surface of the circumference.

2. The system of claim 1, wherein a variable span planet member consist of two or more gear, in contact with a power transfer mechanism between them, so that variable spans are accommodated by rotation or a change in distance between the gears.

3. The system of the claim 2, further comprising an inverted variable pulley mechanism, wherein power is transferred between the pulley and a coaxial, independently rotating hub of the variable span planet member.

4. The system of claim 1, further comprising a variable circumference mechanism of claim 1, comprising at least one surface, at least one guide member to facilitate transition of surface segments from a circumference area to a storage area and provide an attachment point for opposite ends of the surface; bands to compress or tension edges of the surface along with associated compression/tension mechanisms attached to guide members; internal or external storage areas for excess portions of the surfaces and bands; supports to insure that the surface forms in a circumference; and radial arms and radial movement mechanisms for guides.

5. The system of the claim 2, wherein a variable span planet member consist of two or more rollers, in contact with a power transfer mechanism between them, so that variable spans are accommodated by rotation or a change in distance between the rollers.

* * * * *